United States Patent
Niesen

(10) Patent No.: US 10,739,784 B2
(45) Date of Patent: Aug. 11, 2020

(54) RADAR AIDED VISUAL INERTIAL ODOMETRY INITIALIZATION

(71) Applicant: QUALCOMM Incorporated, San Diego, CA (US)

(72) Inventor: Urs Niesen, Berkeley Heights, NJ (US)

(73) Assignee: Qualcomm Incorporated, San Diego, CA (US)

( * ) Notice: Subject to any disclaimer, the term of this patent is extended or adjusted under 35 U.S.C. 154(b) by 147 days.

(21) Appl. No.: 15/826,567

(22) Filed: Nov. 29, 2017

(65) Prior Publication Data

US 2019/0163198 A1 May 30, 2019

(51) Int. Cl.

| G06T 7/50 | (2017.01) |
|---|---|
| G06T 7/246 | (2017.01) |
| B60Q 9/00 | (2006.01) |
| B60T 7/12 | (2006.01) |
| B62D 15/02 | (2006.01) |
| G01C 21/16 | (2006.01) |
| G05D 1/02 | (2020.01) |
| G06T 7/73 | (2017.01) |
| G01S 13/60 | (2006.01) |
| G01S 13/89 | (2006.01) |
| G01S 13/931 | (2020.01) |
| G01S 13/86 | (2006.01) |

(52) U.S. Cl.
CPC .............. *G05D 1/0246* (2013.01); *B60Q 9/00* (2013.01); *B60T 7/12* (2013.01); *B62D 15/025* (2013.01); *G01C 21/165* (2013.01); *G01S 13/60* (2013.01); *G01S 13/867* (2013.01); *G01S 13/89* (2013.01); *G01S 13/931* (2013.01); *G05D 1/0212* (2013.01); *G06T 7/246* (2017.01); *G06T 7/50* (2017.01); *G06T 7/73* (2017.01); *G01S 2013/932* (2020.01); *G06T 2207/10028* (2013.01); *G06T 2207/30241* (2013.01); *G06T 2207/30252* (2013.01)

(58) Field of Classification Search
CPC .. G06T 7/50; G06T 7/246; B60Q 9/00; B60T 7/12; B62D 15/025; G01C 21/165
USPC ......................................................... 701/23
See application file for complete search history.

(56) References Cited

U.S. PATENT DOCUMENTS

| 9,031,809 B1 | 5/2015 | Kumar et al. | |
|---|---|---|---|
| 10,063,972 B1 * | 8/2018 | Zanpure | H04R 3/12 |
| 2014/0300732 A1 * | 10/2014 | Friend | G06T 7/73 |
| | | | 348/135 |

(Continued)

OTHER PUBLICATIONS

Mertz C., et al., "Moving Object Detection with Laser Scanners", Journal of Field Robotics, 2013, vol. 30,No. 1, pp. 17-43.

(Continued)

*Primary Examiner* — Yazan A Soofi
(74) *Attorney, Agent, or Firm* — Qualcomm Incorporated

(57) ABSTRACT

Various embodiments disclose a device with one or more processors which may be configured to translate a radio detection and ranging (RADAR) reference depth map into depth information in at least one image plane of at least one camera, to form a three-dimensional RADAR depth image. The 3D RADAR depth image includes a depth estimate of each pixel. The one or more processors may also be configured to initialize a RADAR-aided visual inertial odometer based on the depth estimates from the RADAR reference depth image to track the device position.

28 Claims, 6 Drawing Sheets

(56) References Cited

U.S. PATENT DOCUMENTS

| | | | |
|---|---|---|---|
| 2016/0086050 A1* | 3/2016 | Piekniewski | G06K 9/4671 |
| | | | 382/103 |
| 2016/0180530 A1 | 6/2016 | Friend et al. | |
| 2016/0291149 A1* | 10/2016 | Zeng | G01S 13/931 |
| 2016/0327395 A1* | 11/2016 | Roumeliotis | G01C 21/165 |
| 2016/0356880 A1* | 12/2016 | Negussu | G01S 7/022 |
| 2017/0015317 A1* | 1/2017 | Fasola | B60W 30/12 |
| 2017/0031032 A1* | 2/2017 | Garin | G01S 19/44 |
| 2018/0202814 A1* | 7/2018 | Kudrynski | G06T 7/55 |
| 2019/0066733 A1* | 2/2019 | Somanath | G06T 7/246 |

OTHER PUBLICATIONS

Andert F., et al., "Lidar-Aided Camera Feature Tracking and Visual SLAM for Spacecraft Low-Orbit Navigation and Planetary Landing", Advances in Aerospace Guidance, Navigation and Control, 2015, pp. 605-623.

Cho H., et al., "A Multi-Sensor Fusion System for Moving Object Detection and Tracking in Urban Driving Environments," IEEE International Conference on Robotics and Automation (ICRA), 2014, pp. 1836-1843.

Chuang Y-Y., "Features," Digital Visual Effects, Spring 2007, 10 Slides.

Fraundorfer F., et al., "Visual Odometry: Part II: Matching, Robustness, Optimization, and Applications," IEEE Robotics & Automation Magazine, vol. 19, No. 2, Jun. 2012, pp. 78-90.

Huang L., "LIDAR, Camera and Inertial Sensors Based Navigation Techniques for Advanced Intelligent Transportation Systems", University of California, Riverside, Dec. 2010, 167 Pages.

Jones E.S., et al., "Visual-Inertial Navigation, Mapping and Localization: A Scalable Real-Time Causal Approach," International Journal of Robotics Research, Sep. 23, 2010, pp. 1-38.

McGarey P., "Visual Odometry (VO)", CSC2541, Feb. 9, 2016, 36 slides.

Nister D., et al., "Visual Odometry," IEEE Computer Society Conference on Computer Vision and Pattern Recognition (CVPR'04), 2004, 8 pages.

Scaramuzza D., et al., "Real-Time Monocular Visual Odometry for On-Road Vehicles with 1-Point RANSAC," IEEE International Conference on Robotics and Automation, 2009, pp. 4293-4299.

Scaramuzza D., et al., "Visual Odometry," Part I: The First 30 Years and Fundamentals, IEEE Robotics & Automation Magazine, Dec. 2011, pp. 80-92.

Zhang J., et al., "Visual-lidar Odometry and Mapping: Low-drift, Robust, and Fast", 2015 IEEE International Conference on Robotics and Automation (ICRA), May 26-30, 2015, pp. 2174-2181.

Zhang J., et al., "Visual-Inertial Combined Odometry System for Aerial Vehicles," Journal of Field Robotics, 2015, vol. 32 (8), pp. 1043-1055.

Aljosa O., et al., "Combined Image- and World-Space Tracking in Traffic Scenes", 2017 IEEE International Conference on Robotics and Automation (ICRA), IEEE, May 29, 2017 (May 29, 2017), pp. 1988-1995, XP033127019, DOI: 10.1109/ICRA.2017.7989230.

International Search Report and Written Opinion—PCT/US2018/062727—ISA/EPO—dated Jun. 11, 2019.

* cited by examiner

RADAR AIDED VISUAL INERTIAL ODOMETRY INITIALIZATION

BACKGROUND

Field

The present disclosure is generally related to visual inertial odometry.

Background

Odometry refers to determining a relative traversal in distance. The relative traversal of distance is measured by changes in position of a sensor or a device attached to the sensor. For example, the odometer of a vehicle indicates how many relative miles have been traveled since the odometer was reset to zero. Visual odometry determines a relative traversal of distance with use of a camera based on the extraction of visual features. The relative traversal of distance may be based on the position and orientation of the camera mounted on the vehicle. Visual inertial odometry (VIO) combines the extracted visual features and inertial-measurement unit (IMU) outputs to compute estimates of the VIO own's position and orientation (e.g. with a camera and IMU coupled together) with respect to some initial frame of reference. The VIO helps advanced driver-assistance systems (ADAS) and autonomous driving of vehicles with positioning of the vehicle.

VIO relies on the initialization of position estimates for the extracted visual features. Current techniques have initial values of position that create large uncertainties (e.g. several tens of meters) as to the initial position. There is a need to provide solutions that reduce the large uncertainty of an initial position used in VIO.

SUMMARY

The various embodiments include one or more processors that translate a radio detection and ranging (RADAR) reference depth map into depth information in at least one image plane of at least one camera, to form a three-dimensional RADAR depth image. The 3D RADAR depth image may include a depth estimate of each pixel. Moreover, the one or more processors may initialize a RADAR-aided visual inertial odometer based on the depth estimates from the RADAR reference depth image to track the device position.

There are various embodiments that includes a method translating a radio detection and ranging (RADAR) reference depth map into depth information in at least one image plane of at least one camera, to form a three-dimensional RADAR depth image. The 3D RADAR depth image includes a depth estimate of each pixel. Moreover, the method includes initializing a RADAR-aided visual inertial odometer based on the depth estimates from the RADAR reference depth image to track a device position.

There are various embodiments that include an apparatus that means for translating a radio detection and ranging (RADAR) reference depth map into depth information in at least one image plane of at least one camera, to form a three-dimensional (3D) RADAR depth image. The 3D RADAR depth image includes a depth estimate of each pixel. Moreover, the apparatus includes means for initializing a visual inertial odometer based on the depth estimates from the RADAR reference depth image to track the device position.

There are various embodiments that include a non-transitory computer-readable storage medium having stored thereon instructions that, when executed, cause one or more processors of a device to translate a radio detection and ranging (RADAR) reference depth map into depth information in at least one image plane of at least one camera, to form a three-dimensional (3D) RADAR depth image. The 3D RADAR depth image includes a depth estimate of each pixel. Moreover, the instructions when executed also cause the one or more processors to initialize a RADAR-aided visual inertial odometer based on the depth estimates from the RADAR reference depth image to track the device position.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

Figure 1:
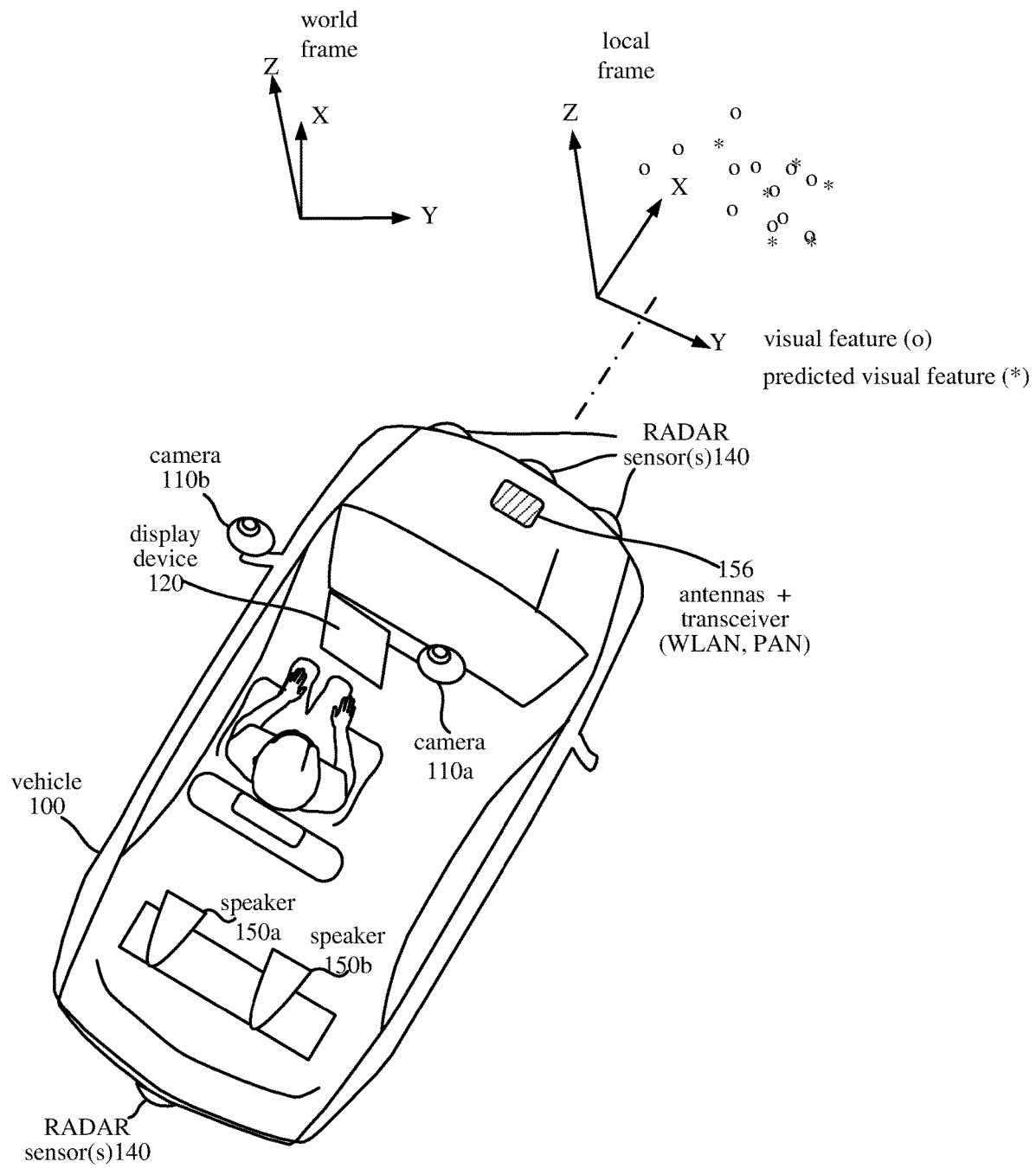
FIG. 1 illustrates an example of a device suitable for implementing various embodiments disclosed herein.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

DETAILED DESCRIPTION

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example, may be the any of the transceivers or antennas described herein that may be "coupled" to a processor, but not necessarily part of the package that includes a command device. Other examples may be inferred from the context disclosed herein, including this paragraph, when using the term "integrated".

As used herein, "a wireless connection" between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

The terms "mobile device", "connected device", "wireless device," and "wireless node" are used interchangeably herein to refer to any electronic device that includes circuitry for wirelessly sending and/or receiving information, including any one or all of cellular telephones, personal or mobile multi-media players, watches, wrist displays, medical devices, headsets, headphones, speakers, microphones, computing devices, and other similar electronics.

As used herein A "and/or" B may mean that either "A and B", or "A or B", or both "A and B" and "A or B" are applicable or acceptable.

As used herein "refine" may include a more granular or accurate estimate of a particular value. For example, the values of position, orientation, velocity, may be more accurate, that just estimating position, orientation and/or velocity based solely on an IMU which may lead to errors over time.

FIG. 1 illustrates an example of a device suitable for implementing various embodiments disclosed herein. The device may be a vehicle 100, or a drone, which includes one or more camera(s) 110a, 110b, and one or more Radio Detection And Ranging, (RADAR) sensor(s) 140 which may be used as part of a RADAR-aided VIO system. For ease of explanation, a vehicle 100 is used as the device suitable for implementing various embodiments herein; however, skilled artisans would recognize that a drone could additionally, or alternatively, be used as the device suitable for implementing various embodiments herein.

As the vehicle in FIG. 1 moves, the one or more camera(s) 110a, 110b may capture one or more images, in the field of view, of the one or more camera(s) 110a, 110b. For example, a camera 110a may be mounted within the cabin of the vehicle. The camera 110a may capture a field of view of the visual scene in front of the vehicle. Additionally, or, alternatively, a camera 110b may be mounted on the outside of the vehicle and capture a field of view of the visual scene in front of the vehicle. A skilled artisan would recognize that an inside camera 110a or outside camera 110b, may be mounted in a number of different positions not just the ones illustrated in FIG. 1.

Each camera has 110a, 110b has its own local reference frame (as depicted in FIG. 1). Each local reference frame may be defined by a z-axis, y-axis and x-axis. The z-y plane is perpendicular to the "forward" direction of travel of the vehicle, depicted by the x-axis. The one or more images, in the field of view, of the one or more camera(s) 110a, 110b may include objects and/or features which may be detected. Depending, on the camera, the field of view (also referred to angular span) may span beyond 180 degrees, e.g., 220 degrees. Additionally, or alternatively, the one or more RADAR sensor(s) 140, may aid with the object and/or feature detection, within the RADAR sensor(s) 140 field of view. The field of view of a RADAR sensor may be less than the field of view of a camera. For example, a RADAR sensor's, field of view may be based on the central beam (also referred to as the main lobe). The angular span of the central beam may vary depending on frequency of the RADAR signal. As an example, the angle of the central beam may be around 60 degrees.

Though the angular span of a RADAR sensor may be less than that of a camera, there may be a substantial overlap between a RADAR sensor(s) 140 field of view and the one or more cameras 110a, 110b field of view. To establish a larger effective field of view, multiple RADAR sensor(s) 140 may be placed in front of the vehicle 100. Thus, by overlapping multiple central beams from each RADAR sensor, the effective field of view may be wider than if just one RADAR sensor is used. The wider effective angle, may also be less than 180 degrees. For example, there may be on the order of a 140 degree overlap from the multiple RADAR's sensor central beam axis (e.g., 0 degrees from center pointing in the normal direction from the RADAR's sensor) with the one or more cameras 110a, 110b field of view.

Object detection using cameras 110a, 110b may have degraded performance in low light conditions, when there are shadows, and/or when varying illumination levels in a visual scene. In contrast, a RADAR sensor is not affected by a shadow or varying illumination levels in a visual scene, and has equivalent performance during the night and day. One disadvantage of using a RADAR sensor is the presence of ground clutter. As the RADAR sensor is used to transmit pulses in the direction of travel, the pulses may reflect off of an elevated road profile ahead. The reflected return signal may arrive at some future time back at the RADAR sensor and be used in object detection. Differentiating between the road profile as an "object" and a different object that is static (e.g., a tree, a non-moving animal, or a parked car) poses a challenge. If, however, RADAR sensor(s) 140 in vehicles detect the doppler frequency shifts as objects move towards, or away from the vehicle 100, the elevated road profile (which is not moving towards or away from the vehicle 100), may be differentiated from the different objects in the field of view of the RADAR sensor(s) 140. It is foreseen by the inventor of this disclosure that using Doppler frequency shifts from moving objects also serves as an advantage in VIO systems.

Using the Doppler frequency shifts, the RADAR measurements by the RADAR sensor(s) 140 provide information about the relative movement of object targets in the RADAR sensor(s) 140 field of view that may not be present using a VIO that includes detecting visual features primarily based on camera(s) 212 (110a, 110b). An assumption with VIO's is that the environment is static. Using the Doppler information of the entire RADAR field of view may be due to the VIO's (or, rather, the vehicle 100 in which the RADAR sensor (s) 140 is mounted) own movement. Hence, the vehicle's 100 movement may be predictable. Deviations from the prediction from a VIO are therefore caused by moving objects. Use of RADAR sensor(s) 140 can thus provide regions in its field of view in which moving objects are present. The angular resolution of a RADAR on the vehicle 100 may be on the order of about five degrees.

One challenge when using a VIO for vehicular applications is that visual features change very rapidly. Due to the relatively fast motion of vehicles, new visual features are added often to the VIO updater (see next figure(s)). The VIO updater tracks the three-dimensional (3D) position of each feature in its state. To add a new feature to the state, each 3D position may be set to an initial value (i.e., is initialized). The z and y components of the 3D position may be initialized from the two-dimensional (2D) position of the visual feature on the cameras 110a, 110b image plane. However, the depth component (x-component in FIG. 1) of the visual feature is challenging to initialize, since the depth of a newly added visual feature is initially unknown. The problem may be solved by initializing the depth to some fixed constant value (e.g., ten meters) that may correspond to a large uncertainty (e.g., several tens of meters) captured by a corresponding filter covariance entry in the VIO updater. The large initial uncertainty signifies that the tracked visual features may initially not be very useful and may require tracking for some time to become meaningful, until a better depth estimate is established with a VIO system that relies on using cameras 110a, 110b for depth estimation. Ultimately, relying on a cameras 110a, 110b depth estimation along with an initial value for depth that has a large uncertainty limits the performance of VIO in the vehicular context, leading to increased position estimate drift of the vehicle that includes the VIO.

In an embodiment, one or more processors (e.g., see FIG. 6) may be configured to translate a RADAR reference depth map into depth information in at least one image plane of at least one camera 110a, 110b, to form a three-dimensional RADAR depth image. The 3D RADAR depth image may include a depth estimate (i.e., a RADAR-aided depth information) of each pixel. The one or more processors may initialize a visual inertial odometer (see FIG. 2 and FIG. 3) based on the depth estimates from the RADAR reference depth image to track the device position (e.g., of vehicle 100 (or drone that's not expressly drawn)). Based on the depth estimate of each pixel, the VIO updater (see other figures) may detect a new visual feature. The RADAR-aided depth information may then be used to initialize the newly added visual feature depth in the VIO updater. The RADAR-aided depth initialization may be more precise (e.g., an order of magnitude better than 10 meters). The increased (i.e., more precise) precision may allow for the updater state of the newly added feature to be initialized with a lower filter covariance entry instead of primarily relying on a fixed constant value that was updated based on the cameras 110a, 110b depth estimate (as previously explained). The RADAR-aided depth initialization provides the advantage, in sharp contrast, with the tens of meter of uncertainty over primarily relying on a fixed constant value that was updated based on the cameras 110a, 110b depth estimate. The more precise initialization may allow for the VIO updater to more quickly to assess the position of the vehicle 100, without the VIO having been tracked over an extended period (e.g., dozens, or possibly hundreds of frames). The RADAR-aided depth initialization, may therefore, substantially alleviate the problem of tracking the frequently addition of new visual features.

Figure 2:
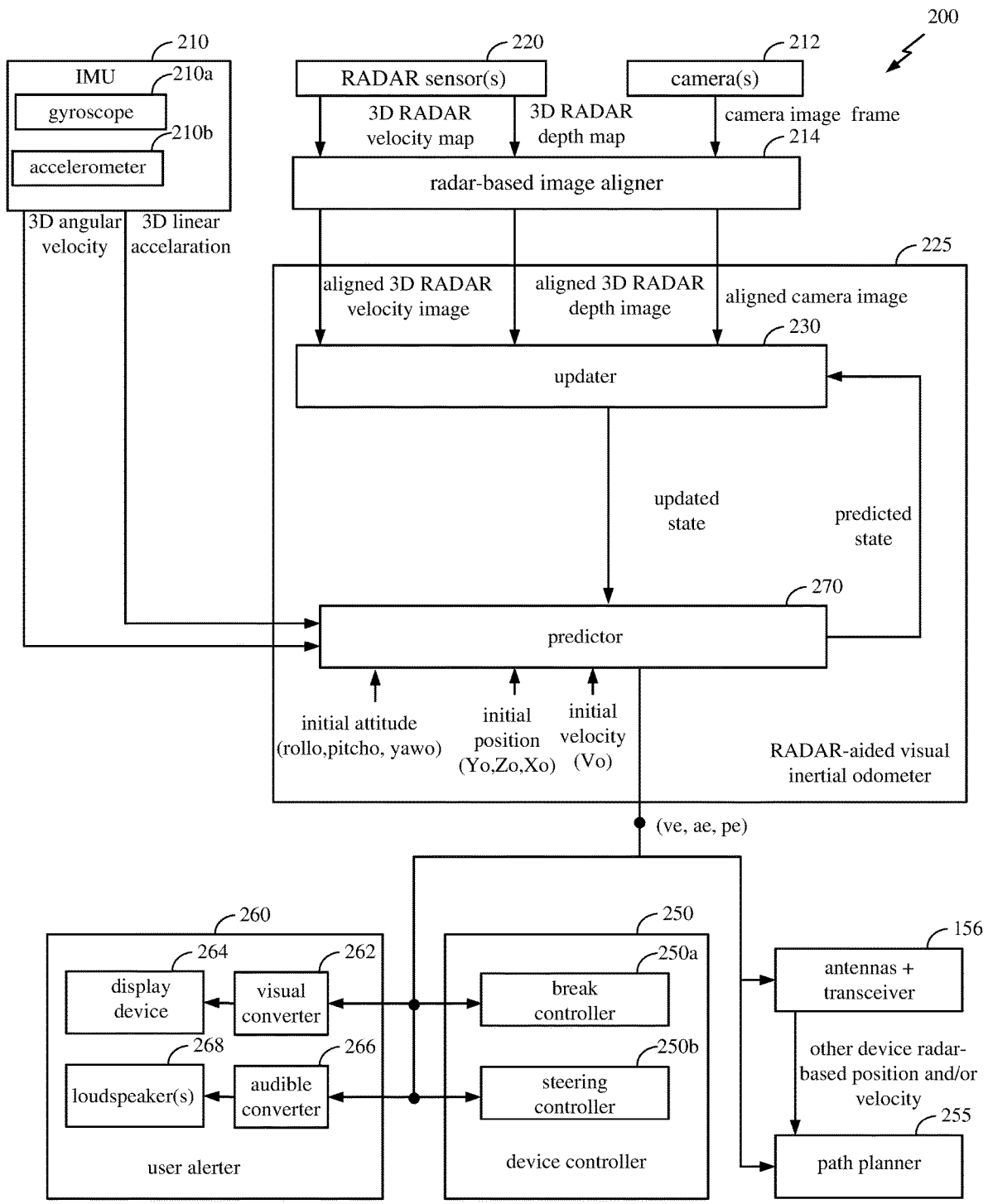
FIG. 2 illustrates a block diagram which includes a RADAR-aided visual inertial odometer.

To further expand on the RADAR-aided depth initialization, FIG. 2 illustrates a block diagram 200 which includes a RADAR-aided visual inertial odometer 225.

In an embodiment, a device (such as a vehicle 100 or a drone) may include one or more RADAR sensor(s) 220. Skilled artisans would recognize that there may be one or more RADAR sensor(s) 220, where the field of view of the one or more RADAR sensor(s) 220 may be overlapped to produce an equivalent field of view. The one or more RADAR sensor(s) 220 may produce a three-dimensional (3D) RADAR (reference) depth map and/or a 3D RADAR velocity map.

In addition to, or alternatively, the vehicle 100 may include one or more camera(s) 212, and in the field of view of the one or more camera(s) capture visual scenes and output multiple video frames. A video frame is denoted as a camera image frame in FIG. 2. The one or more camera image frames are each located in the respective image plane of at least one camera 110a, 110b.

The vehicle 110 may include a RADAR-based image aligner 214. The RADAR-based image aligner may be included in one or more processor(s) (see FIG. 6). In an alternative embodiment, the one or more camera(s) 212, and one or more RADAR sensor(s) 220 may be integrated into a RADAR-camera sensor unit. In the alternative embodiment, the RADAR-based image aligner may be included in the RADAR-camera sensor unit. Whether located in the RADAR-camera sensor unit, or located in the one or more processor(s), the RADAR-based image aligner may be used to translate the RADAR reference depth map into depth information into at least one image plane of at least one camera 212, to form a three-dimensional (3D) RADAR depth image. In an embodiment, there may be a one-time alignment step (e.g., a calibration step) where regions in the RADAR's reference frame may be translated into regions on the image plane of at least one camera. For example, the RADAR's reference frame which has a larger field of view (relative to the camera(s) 212 (110a, 110b) may be interpolated, so that the angular resolution in the RADAR's reference frame is matched, or, on the order of the camera(s) 212 (110a, 110b) smaller field of view (and which includes a higher density of visual points).

As mentioned in FIG. 1, the aligned 3D RADAR depth image includes a depth estimate of each pixel. The RADAR-aided visual inertial odometer 225 may be included in one or more processor(s) (see FIG. 6). The RADAR-aided visual inertial odometer 225 may include an updater 230 (which also may be referred to as a VIO updater 230), and predictor 270 (which also may be referred to as a VIO predictor 270). The VIO updater 230 may be used to initialize a state updater 360 (see FIG. 3) based on the depth estimates from the RADAR reference depth image to track the device (i.e., vehicle 100 or drone) position. The VIO updater 230 provides an updated state to the VIO predictor 270 that may be based on the RADAR-aided depth initialization. The RADAR-aided depth initialization may include the VIO predictor 270. The VIO predictor 270 may be initialized by: (a) an initial attitude (i.e., an initial roll (Roll0), pitch (Pitch0), and yaw (Yaw0)); an (b) initial three-dimensional (3D) position (i.e., Xo, Yo, and Zo); and (c) an initial velocity (Vo) of the device.

The device may include an inertial measurement unit (IMU) 210 which includes a gyroscope 210A that provides three-dimensional (3D) angular velocity measurement of the device. The IMU 210 may also include an accelerometer 210B which provides the three dimensional (3D) linear acceleration of the device. Integrating the measured (i.e., sensed) linear acceleration results in an estimate of the velocity of the device. Integrating the estimate of the velocity of the device results in a refined estimate of the position of the device. To integrate in the appropriate direction, an estimate of the orientation may be needed. Integrating the measured 3D angular velocity determines the estimate of a three-dimensional (3D) orientation. There are errors in the gyroscope 210A and accelerometer 210B which causes drifts in the velocity, position and orientation.

To reduce the drift error produced by the IMU 210, the camera(s) 110a, 110B and the RADAR sensor(s) 220, or other sensors in conjunction with a state updater 360 (see FIG. 3) may aid in providing estimates of the integrated quantities. In FIG. 4, for example, the state updater 360 outputs state estimates (ae, ve, pe), where ae is an estimate of the orientation of the device, ve is an estimate of the linear velocity of the device, and pe is an estimate of the position of the device.

In an embodiment, these updated state estimates (ae, ve, pe) may be used by a device controller 250. The device controller may include a break controller 250A and a steering controller 25B. In an embodiment, the break controller 250A may send a control signal to a break sensor, which in turn, aids in the applying of breaks to the device (e.g., vehicle 100 or a drone). As an example, if one of the moving objects is approaching the vehicle 100 rapidly, the RADAR sensor(s) 220 may estimate a doppler frequency associated with the object and determine that there may be a collision with a moving object coming towards the vehicle 100. The moving object may be detected using visual feature detection. The detected visual features (denoted by an (o) in FIG. 1), for an object (whether moving or static) may be tracked by the RADAR-aided visual inertial odometer. An updated estimate of the newly added visual features (further described in association with FIG. 3) may be based on associating the visual features of an object (whether moving or static). The updated state estimates (ae, ve, pe) may be based on the newly added visual features, and provided to the break controller 250A.

Thus, if one of the moving objects is approaching the vehicle 100 rapidly, the break controller 250A of the device (i.e., the vehicle 100 or drone) may slow down (by the application of breaks) to the device based on the RADAR-aided depth initialization. The RADAR-aided depth initialization may include the initialization of the depth (x-component) of the 3D position of the newly added (to the RADAR-aided VIO) visual features. The camera(s) 212 aid in the selection of the two-dimensional positions (y-component and z-component) of the newly added visual features. The selection of the two-dimensional positions of the newly added visual features are also aided by the predicted three-dimensional (3D) positions of the tracked visual features, which are denoted with an asterisk (*) in FIG. 1.

In the same or alternative embodiment, a steering controller 250B may help in steering the device (either to avoid a collision, or as part of the vehicle's 100 path planning). Whether the vehicle 100 is self-driving, semi-autonomous, and/or aids a human driver, a steering controller 250B may send a signal to help a steering wheel move in a direction as to avoid a collision, or as part of path planning in the path planner 255. The steering controller 250B may also be based on the RADAR-aided depth initialization. The RADAR-aided depth initialization may include the initialization the depth's (x-component) 3D position of the newly added visual features that are being added to the state of the RADAR-aided visual inertial odometer. The camera(s) 212 aid in the selection of the two-dimensional positions (y-component and z-component) of the new visual features.

In the same or alternative embodiment, the updated state estimates (ae, ve, pe) may be used by a user alerter 260. The user alerter 260 may include a visual converter 262 that is coupled to a display device 264. The display device 264 may be as the display device 120 is illustrated in FIG. 1. Skilled artisans will recognize that the display device 120 may be located in a number of locations within the vehicle, or integrated into a drone. Moreover, there may be more than one display device 120, so multiple people in the vehicle may see similar information on a display device 120. As such, the user alerter 260 may visually alert one or more persons, for example the driver (or one or more of the passengers) of the vehicle's 100 tracked refined position, and/or refined velocity, and/or refined acceleration, and/or orientation.

The vehicle's 100 displayed visual representation of its own tracked position, and/or velocity, and/or acceleration may also be based on the on the initialization of the RADAR-aided depth initialization. The RADAR-aided depth initialization may lead to a RADAR-based feature association of the depth's (x-component) of the 3D position of the newly added visual features. The camera(s) 212 aid in the selection of the two-dimensional positions (y-component and z-component) of the newly added visual features.

In the same or alternative embodiment, the user alerter 260 may include an audible converter 266 that is coupled to one or more loudspeaker(s) 268. The one or more loudspeaker(s) 268 may be as the loudspeakers 150A, 150 illustrated in FIG. 1. Skilled artisans will recognize that the speakers 150A, 150B may be located in a number of locations within the vehicle, or integrated into a drone.

Moreover, there may be more than one set of speakers 150A, 150B, so multiple people in the vehicle may hear similar information. As such, the user alerter 260 may audibly alert one or more persons, for example the driver (or one or more of the passengers) of the vehicle's 100 tracked refined position, and/or refined velocity, and/or refined acceleration, and/or orientation.

The vehicle's 100 rendered (i.e., play-out) audible representation of its own tracked refined position, and/or refined velocity, and/or refined acceleration, and/or orientation, and may also be based on the RADAR-aided depth initialization. The RADAR-aided depth initialization may lead to a RADAR-based feature association of the depth's (x-component) of the 3D position of the newly added visual features. The camera(s) 212 aid in the selection of the two-dimensional positions (y-component and z-component) of the newly added visual features.

In the same or alternative embodiment, the updated state estimates (ae, ve, pe) may be used by antennas and transceiver 156 may include one or more antennas and a transceiver, coupled to the one or more antennas, to wirelessly transmit the vehicle's 100 tracked refined position, and/or refined velocity, and/or refined acceleration, and/or orientation, and may also be based on the on the initialization of the RADAR-aided depth initialization may The RADAR-aided depth initialization may lead to a RADAR-based feature association of the depth's (x-component) of the 3D position of the newly added visual features. The camera(s) 212 aid in the selection of the two-dimensional positions (y-component and z-component) of the newly added visual features.

In the same or alternative embodiment, multiple vehicles may have a wireless connection between each other. The other vehicles may wirelessly transmit their tracked refined position, and/or refined velocity, and/or refined acceleration, and/or orientation. The antennas and receiver 156 may wirelessly receive at least one other vehicle's tracked refined position, and/or refined velocity, and/or refined acceleration, and/or orientation, which may also be based on the initialization of a RADAR-based feature association of the depth's (x-component) of in the 3D position of the newly added visual features of the at least one other vehicle. The at least one other vehicle's camera(s) 212 aid in the selection of the two-dimensional positions (y-component and z-component) of the newly added visual features of the at least one other vehicle.

In the same or alternative embodiment, the updated state estimates (ae, ve, pe) may be used by a path planner 255 to coordinate where the vehicle 100 may move to (i.e., what is the planned navigation route). Thus, the planned navigation route is based on the updated state estimates (ae, ve, pe), which may also be based on the on the initialization of a RADAR-based feature association of the depth's (x-component) of in the 3D position of newly added visual features.

Figure 3:
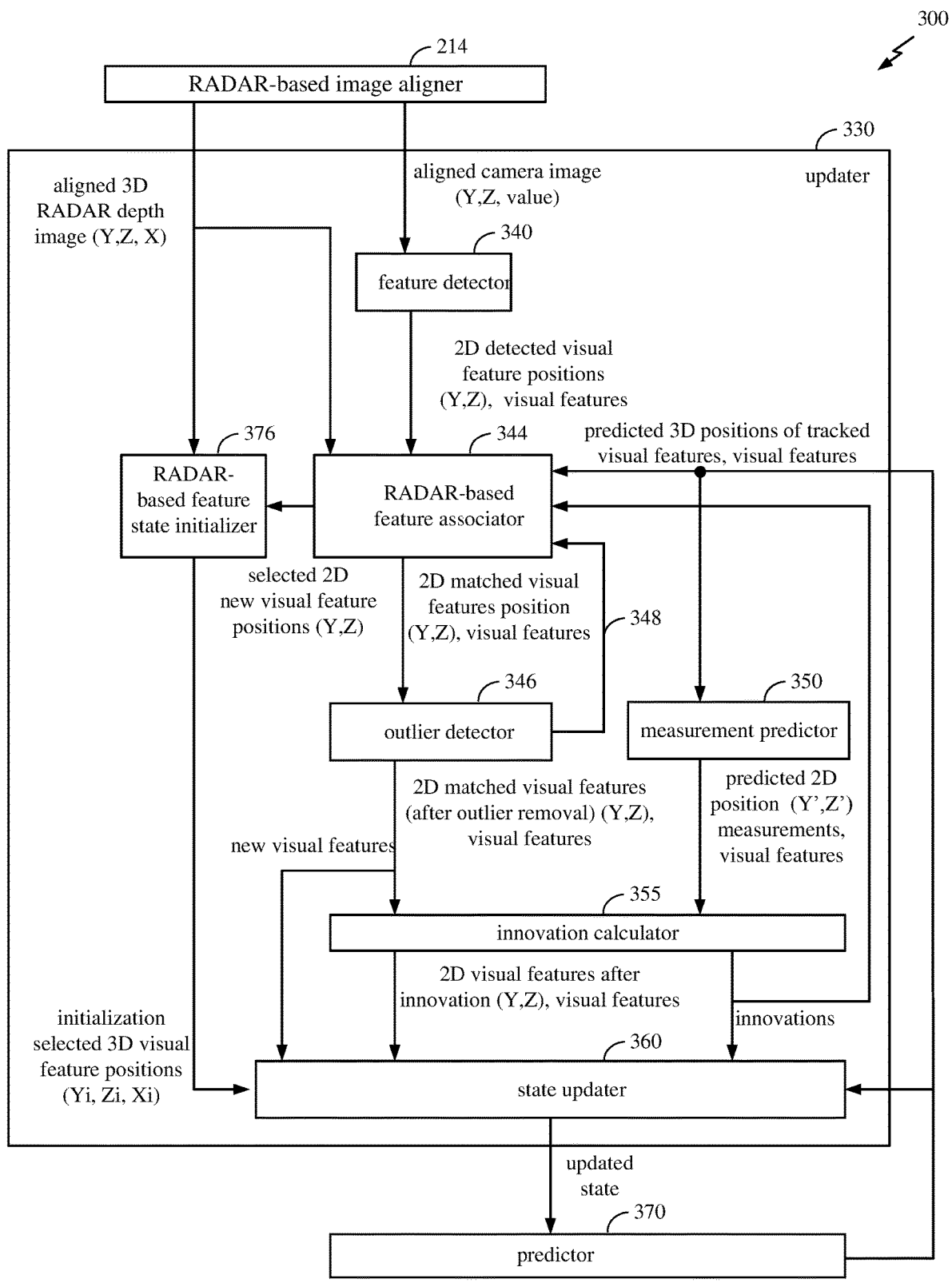
FIG. 3 illustrates an embodiment of an initialization of selected 3D visual feature positions.
Figure 4:
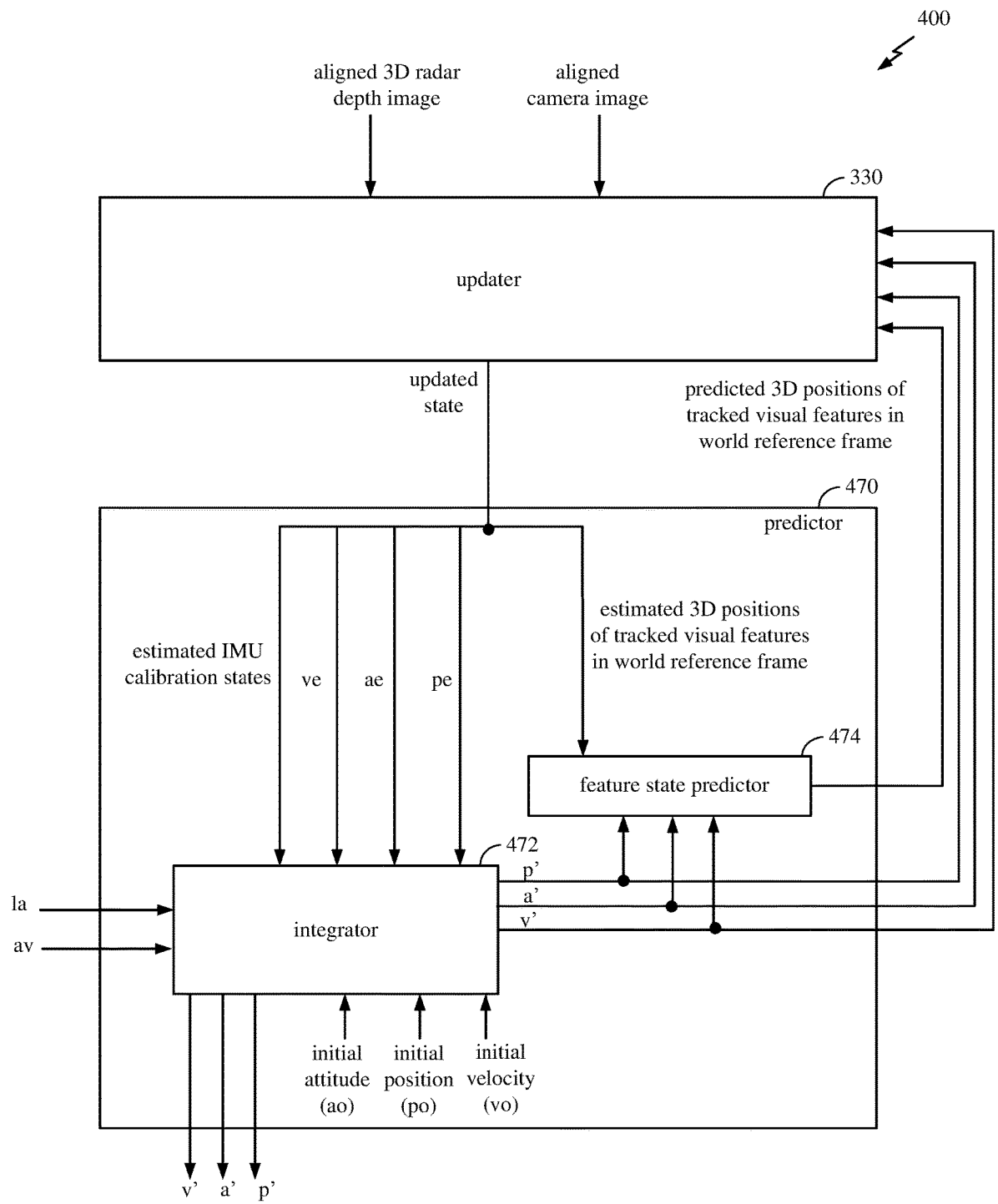
FIG. 4 illustrates an embodiment which includes estimated and predicted 3D positions of tracked visual features.

FIG. 3 illustrates an embodiment 300 of an initialization of selected 3D visual feature positions. The updater 330 may update multiple states including ae, ve, and pe previously described. In addition, the updater 330 may have states for each visual feature (x). Thus, each visual feature may have its own position estimate (e.g., as shown in by an asterisk (*) in FIG. 1). The updater 330, which may be included in one or more processors (see FIG. 6), includes a feature detector 314 that detects two-dimensional (2D) visual feature positions (y-component, z-component) from the camera(s) 212 based on the aligned camera image from the RADAR-based image aligner 214 previously described. The feature detector 314 may extract and detect different types of features associated with an object. For example, the following different types of features may be detected: (a) an edge (e.g., large gradient magnitude); (b) a corner (e.g., rapid changes in direction); (c) a blob (e.g. a description of image structures in terms of regions); or, a ridge (e.g., a one-dimensional curve that represents an axis of symmetry)).

The updater 330 also includes a RADAR-based feature associator 344 that receives the 2D visual feature positions from the camera(s) 212 as an input, along with predicted 3D positions of tracked visual features and the tracked visual features themselves. The predicted 3D positions of tracked visual features may be based on measurements aided by the IMU 210, the integrator 472, and the feature state predictor 474 (see FIG. 4). The feature state predictor 474 may output the predicted 3D positions of tracked visual features and the visual features. The predicted 3D positions of tracked visual features may be represented in a three-dimensional (3D) world reference frame.

A translation between the 3D world reference frame and the 3D camera frame is aided by the IMU 210. The IMU 210 may estimate its 3D position and 3D orientation. As the camera(s) 212 (110a, 110b) may be coupled to the vehicle 100 (or drone) by a lever, and the IMU 210 is mounted to the vehicle 100, the translation between IMU 210 3D position and 3D orientation and the camera(s) 212 (110a, 110b) may be computed, and the 3D position and 3D orientation of the camera(s) 212 (110a, 110b) may also be estimated in a 3D world reference frame. Thus, based on the 3D position and orientation of the camera in the current frame, prediction of the 3D orientation and 3D position of the next camera reference frame may be performed. The 3D orientation and 3D position of the current camera reference frame may be projected into a 2D camera image plane as part of the measurement predictor 350, or, prior to the measurement predictor 350. From the 2D camera image plane, 2D visual features of a future frame may be predicted. The predicted 2D position measurements and visual features in the cameras 212 (110a, 110b) are shown at the output of the measurement predictor 350.

Outputs of the RADAR-based feature associator 344 include the 2D matched visual features position(s), and the visual features. The RADAR-based feature associator 344 determines which 2D visual features detected by the feature detector 340 correspond to the predicted 3D positions provided by the predictor 370. The correspondence between the predicted 3D positions of the visual features and the 2D visual detected features may be based on an association list between the detected vs. predicted visual features. Matching the 2D detected visual features to the 3D predicted positions in the association list may be based on either a similarity measure (i.e., how similar are the visual features (detected vs. predicted)), or, distance error between positions of the 2D detected visual features and 3D predicted positions, or, a combination of both a similarity measure and distance error between visual feature (detected vs. predicted) positions. The associator may also use the aligned 3D RADAR depth image to compute a depth of the 2D visual feature, which can then be directly compared with the predicted 3D positions. A similarity measure may be based on searching around a neighborhood of points from the predicted position, and trying to find similar values between visual features. Another similarity measure may use a "greedy algorithm" known to skilled artisans to try and find the best matched visual feature in the neighborhood of points of the predicted position provided by the updater 370.

The positions of the 2D matched visual features may include outliers, i.e., values of positions (or similarity values from the similarity measure) which are inordinate to the other 2D matched features. The inordinate values (positions or similarity values) may be detected with an outlier detector 346. An inordinate value may result because the predicted visual features (output of the feature state predictor 474) are no longer in the field of view of the camera(s) 212 (110*a*, 110*b*) though they are still inside the feature state predictor 474. Consequently, the corresponding 2D visual feature (e.g., a corner point) is not observed by the camera(s) 212 (110*a*, 110*b*), detected by the feature detector 340, or matched by the RADAR-based feature associator 344.

Once the outliers are removed by the outlier detector 346, the remaining 2D matched visual features are passed to the innovation calculator 355. In an alternative embodiment, the innovation calculator 355 and/or the measurement predictor 250, and/or the outlier detector 346 may be included in the RADAR-based feature associator 344. The innovation calculator 355 calculates the error between the 2D visual features from the measurement predictor 350 and the remaining 2D matched visual features after the outlier detector 346. Each error between a 2D visual feature (based on the projection into the camera image plane), and a remaining 2D matched visual feature after the outlier detector 346 (already in the camera image plane) may be referred to as an innovation. An innovation may be based on a distance error and/or a similarity measure. In an embodiment, the innovations are also fed back into the RADAR-based feature associator 344 and may be used as part of the determination of which 2D visual features detected by the feature detector 340 correspond to the predicted 3D positions provided by the predictor 370. The innovations, and the remaining 2D matched visual features after the outlier detector 346 may be sent to the state updater 360.

The RADAR-aided visual inertial odometer may track a 3D position of each "ith" visual feature in the field of view of the camera(s) 212 (110*a*, 110*b*) on the vehicle 100 (or drone). However, as mentioned previously, one challenge when using a VIO for vehicular applications is that visual features change very rapidly. Due to the relatively fast motion of vehicles, new visual features are added often to the VIO updater 330 (i.e., the state updater 360 in the VIO updater 330). As the depth of a newly added visual feature is initially unknown, the depth component of the visual feature is challenging to initialize. The depth dimension (x-component) of the new visual features for the state updater 360 is based on the aligned 3D RADAR depth image output by the RADAR-based image aligner 214. As a translation of the RADAR's reference depth map may be aligned with at least one image plane of at least one camera, to form a three-dimensional RADAR depth image. The 3D depth image may include a depth estimate of each pixel.

The RADAR-aided depth initialization may include initialization of the RADAR-based feature state initializer 376. The RADAR-based feature state initializer 376 may store the aligned 3D RADAR depth image in a first look up table (LUT1). The first look up table may store the positions (i.e., coordinates ($Y_i$, $Z_i$) of each pixel), and store the depth estimate ($X_i$)) of each pixel. The RADAR-based feature associator 344 may output selected 2D new visual feature positions (Y, Z) to be added to the VIO updater 330. The selected 2D new visual feature positions (Y, Z) may be used to index (i.e., look up) the corresponding depth estimate in the first look up table associated with each pixel to provide an initial value for each newly added visual feature. The initial value of the position ($Y_i$, $Z_i$) for each newly added visual feature would then be comprised of the selected 2D new visual feature, and the depth estimate ($X_i$) for each pixel. It should be noted that sometimes positions of visual features are denoted as $Y_i$, $Z_i$, and sometimes the positions are denoted as Y, Z, and may be used interchangeably throughout the disclosure.

The selected 2D new visual feature positions (Y, Z) to be added to the VIO updater 330 may be output from the RADAR-based feature associator 344 after the outlier detector 346 has removed the outliers. The remaining 2D matched visual features after the outlier detector 346 may be fed back to the RADAR-based feature associator 344 so that visual features may be selected. The visual feature selection includes both prior visual features which have been tracked by the RADAR-aided VIO, and newly added visual features which may be determined by the RADAR-based feature associator 344 with the four inputs illustrated in FIG. 3. The RADAR-based feature associator 344 may comprise of multiple inputs, as illustrated in FIG. 3. In an embodiment, the multiple inputs are: (i) the 2D selected visual feature positions (Y, Z); (ii) predicted 3D positions of tracked visual features, visual features; (iii) innovations (though in a different embodiment, the innovations may be calculated within the RADAR-based feature associator 344); and (iv) the 2D matched visual features (after outlier removal).

The state updater 370 may receive as input: (i) the initial values of the selected 3D visual feature positions for each 3D visual feature ($Y_i$, $Z_i$, $X_i$); (ii) the newly added visual features; (iii) the 2D visual features after innovation; (iv) the innovations; and (v) the predicted 3D positions of tracked visual features in world reference frame and the predicted values for the vehicle's 100 position, linear velocity, and acceleration.

FIG. 4 illustrates an embodiment which includes estimated and predicted 3D positions of tracked visual features. The predictor 470 receives the updated state and the estimated IMU calibration states from the updater 330. The estimated IMU calibrations states may help the integrator 472 to refine the linear acceleration (la) and angular velocity (av) estimates, and produce (i.e., generate or output) refined estimates of the vehicle's 100 linear velocity (v'), linear acceleration (a'), 3D position (p'). The feature state predictor 474 within the predictor 470 may also receive the estimated 3D positions of tracked visual features in world reference frame. The feature state predictor 474 may receive the refined estimates of the vehicle's 100 linear velocity (v'), linear acceleration (a'), and 3D position (p'). Based on the estimated 3D positions of the tracked visual features in the world reference frame, and the estimates of the vehicle's 100 linear velocity (v') and linear acceleration (p'), the feature state predictor 474 may predict 3D positions (in a world reference frame) of each of the tracked visual features. The predicted 3D positions of each of the tracked visual features may then be sent for the next frame to the updater 330.

The RADAR-aided visual inertial odometer is configured to track device position based on estimating a three-dimensional position of the device in a world reference frame, and the three-dimensional position of tracked visual features, across two or more camera image frames, in the world reference frame. That is to say, tracking of device position, device orientation, device velocity, and tracking of the visual features (and the positions of the visual features) may take place over a current image frame, where the visual features are detected, and the next image frame's visual features are predicted for the next image frame. The tracking of the device position, device orientation, device velocity, and the tracking of the visual features (and the positions of the visual features) continues in the next image frame based on the updater 330 and predictor 370. The tracking of the device position, device orientation, device velocity, and the tracking of the visual features (and the positions of the visual features is based on detection of the one or more two-dimensional positions of visual features in a current camera image frame, and association, in the RADAR-based feature associator 344, the one or more two-dimensional positions of the visual features of the current camera image frame with predicted three-dimensional positions of the visual features of the current camera image frame, and selection of two-dimensional positions of new visual features based on the association in the RADAR-based feature associator. Moreover, the tracking of the device position, device orientation, device velocity, and the tracking of the visual features (and the positions of the visual features) is based on the adding of the newly visual features and their association in the RADAR-based feature associator.

Figure 5:
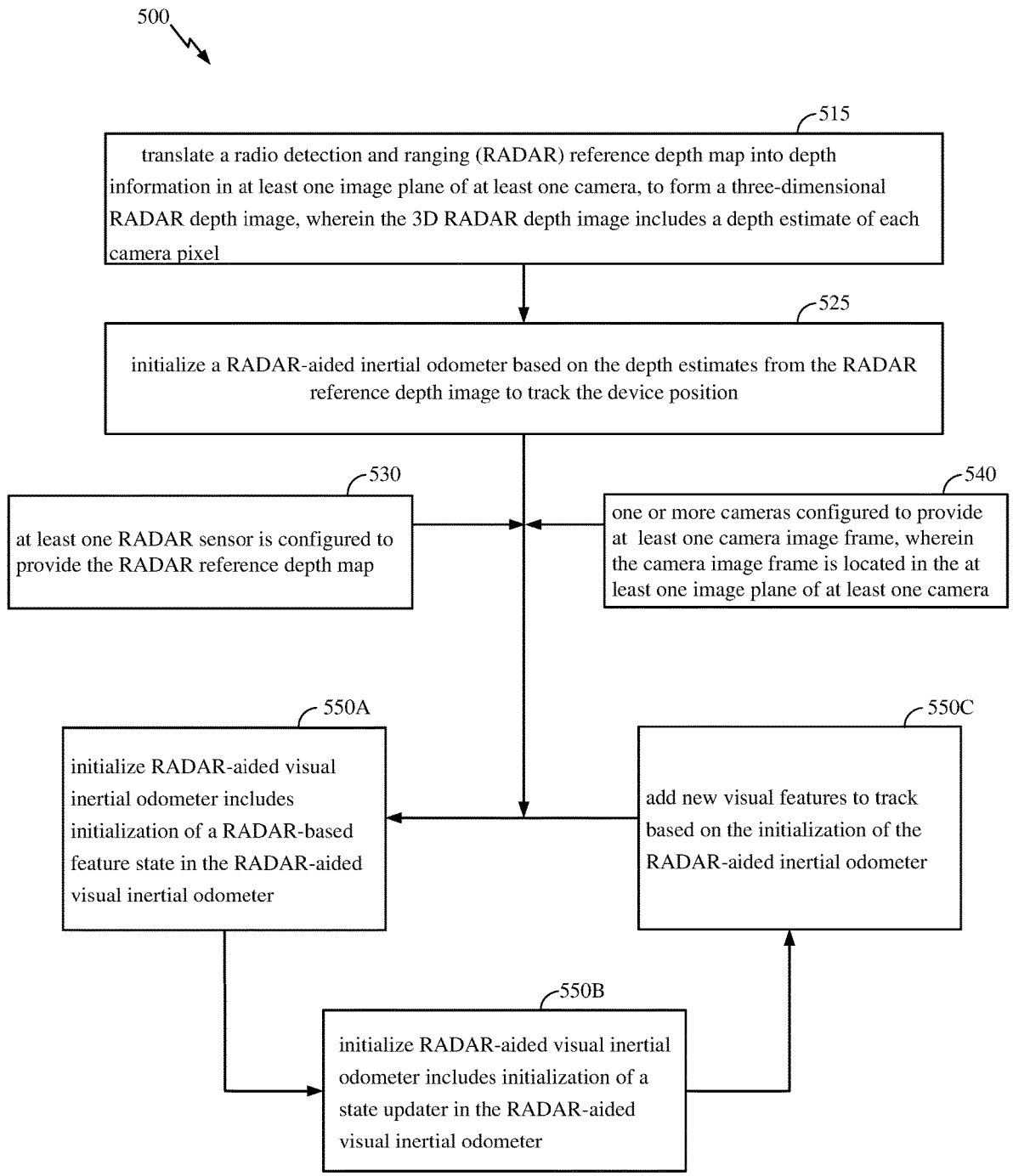
FIG. 5 illustrates an exemplary flowchart that describes techniques disclosed herein.

FIG. 5 illustrates an exemplary flowchart that describes techniques disclosed herein that may be implemented in a device. The device, e.g., vehicle 100, may include one or more processors that are configured to translate a radio detection and ranging (RADAR) reference depth map into depth information in at least one image plane of at least one camera, to form a three-dimensional RADAR depth image, wherein the 3D RADAR depth image includes a depth estimate of each pixel 515. The one or more processors may also be configured to initialize a visual inertial odometry predictor based on the depth estimates from the RADAR reference depth image to track the device position 525.

The device may include at least one RADAR sensor that is configured to provide the RADAR reference depth map 530. The device including one or more cameras configured to provide at least one camera image frame, wherein the camera image frame is located in the at least one image plane of at least one camera 540.

In addition, the one or more processors may be configured to initialize RADAR-aided visual inertial odometer includes initialization of a RADAR-based feature state in the RADAR-aided visual inertial odometer 550A. Subsequently, the one or more processors may be configured to initialize RADAR-aided visual inertial odometer includes initialization of a state updater in the RADAR-aided visual inertial odometer 550B. The one or more processors may be configured to add new visual features to track based on the initialization of the RADAR-aided inertial odometer 550C. Except on the first frame, subsequent to the one or more processors being configured to add new visual features to track based on the initialization of the RADAR-aided inertial odometer 550C, the one or more processors are configured to initialize the RADAR-based feature state in the RADAR-aided visual inertial odometer 550A.

Figure 6:
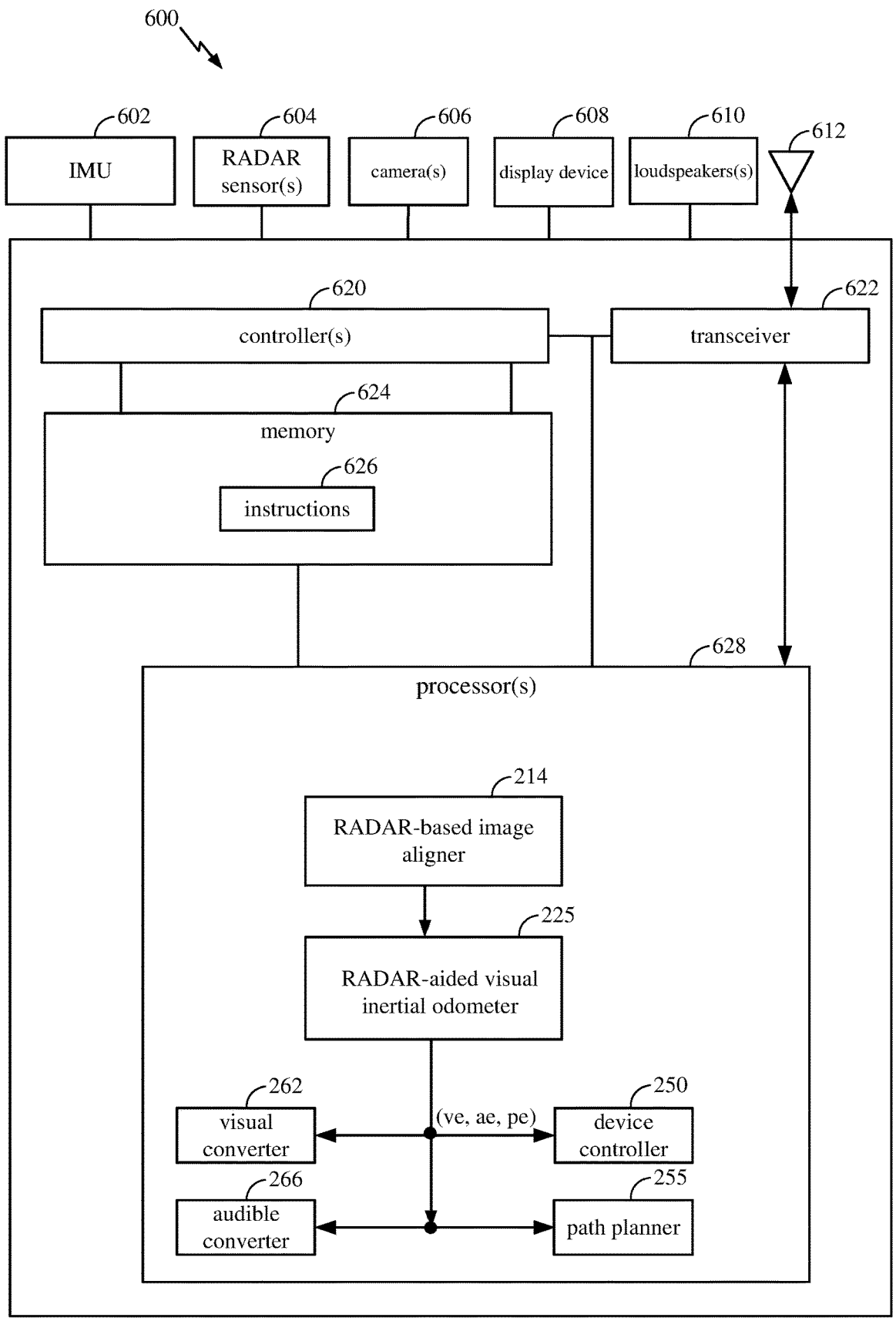
FIG. 6 illustrates an exemplary component block diagram of a device suitable for implementing various embodiments disclosed herein.

FIG. 6 illustrates an exemplary component block diagram of a device 601 suitable for implementing various embodiments disclosed herein. In various implementations, the device 601 may have more components, or, fewer components than illustrated in FIG. 6. The device 601 may be a vehicle 100, a drone, a robot, or another electronic device with navigational capabilities.

In a particular implementation, the device 601 includes one or more processor (s) 628 which may include: a central processing unit (CPU); or a digital processor (DSP); or a graphics processing unit (GPU), coupled to the memory 626. The memory 626 includes instructions 630 (e.g., executable instructions) such as computer-readable instructions or processor-readable instructions. The instructions 630 may include one or more instructions that are executable by a computer, such as the processor 628.

FIG. 6 also illustrates one or more controller(s) 620 that are coupled to the one or more processor(s) 628, and to a number of components in the device 601. For example, the one or more controllers 620 may be coupled to various peripheral devices (e.g., IMU 602, RADAR sensor(s) 604, camera(s) 606, display device 608, and loudspeaker(s) 610). The display device 608 may be the display device 120, and serve the purpose of the display device 120. The RADAR sensor(s) 604 may be the RADAR sensor(s) 220, and serve the same purpose as the RADAR sensor (s) 220. The camera(s) 606 may be the camera(s) 212, 110*a*, 110*b*, and serve the same purpose of the camera(s) 212, 110*a*, 110*b*. The loudspeaker(s) 610 may be the loudspeaker(s) 150A, 150B and serve the same purpose as the loudspeaker(s) 150A, 150B.

The device 601 may include transceiver 622, and the transceiver 622 may be coupled to the one or more processor (s) 628 and to an antenna 612, such that wireless data (e.g., the positions of the newly added features based on the RADAR-aided depth initialization) may be transmitted to other vehicles (or drones or robots). In some implementations, the one or more processor(s) 628, the controller(s) 620, the memory 626, and the transceiver 622 may be included in a system-in-package or system-on-chip device. In some implementations, the various peripherals may be integrated into the device 601.

Moreover, in a particular implementation, as illustrated in FIG. 6, IMU 602, RADAR sensor(s) 604, camera(s) 606, display device 608, and loudspeaker(s) 612 are external to the system-on-chip device. In a particular implementation, each of the IMU 602, RADAR sensor(s) 604, camera(s) 606, display device 610, and loudspeaker(s) 610, and the antenna 612 may be coupled to a component of the system-on-chip device, such as one or more controller(s) 620, or the memory 626.

In a particular implementation, illustrated in FIG. 6, the one or more processor(s) 628 may include a RADAR-based image aligner 214, and a RADAR-aided visual inertial odometer 225 (as previously described) that are coupled to each other. The output of the RADAR-aided visual inertial odometer 225 in the one or more processor(s) 628 may output the updated state estimates (ve, ae, pe) of the velocity, acceleration and 3D positions of the newly added features based on the RADAR-based depth initialization. The updated states may be provided to a device controller 250 (as previously described), that may be coupled to the RADAR-aided visual inertial odometer 225. The updated states may be provided to a path planner 255 (as previously described), that may be coupled to the RADAR-aided visual inertial odometer 225. The updated states may be provided to a visual converter 262 (as previously described), that may be coupled to the RADAR-aided visual inertial odometer 225. The updated states may be provided to an audible converter 266 (as previously described), that may be coupled to the RADAR-aided visual inertial odometer 225. In other implementations, the device controller 250, the path planner 255, the visual converter 262, and/or the audible converter 266 may be external to the one or more processor(s) 628, or possibly external to the system-on a chip device.

In an illustrative implementation, the memory 626 may include or correspond to a non-transitory computer readable medium storing the instructions 630. The instructions 630 may include one or more instructions that are executable by a computer, such as the one or more processor(s) 628. The instructions 630 may cause the one or more processor(s) 628 to perform one or more operations described herein, including but not limited to one or more portions of the descriptions associated with any of the FIGS. 1-5.

In a particular implementation, one or more components of the systems and devices disclosed herein may be integrated into a drone, car, bus, indoor or outdoor robot, or apparatus (e.g., an electronic device, or a processor therein), that is coupled to, or is integrated with one or more camera(s) 212, 110a, 110b, and/or radar sensor(s) 220.

In conjunction with the described techniques, a device includes means for translating a radio detection and ranging (RADAR) reference depth map into depth information in at least one image plane of at least one camera, to form a three-dimensional (3D) RADAR depth image. The 3D RADAR depth image may include a depth estimate of each pixel, and means for initializing a visual inertial odometer may be based on the depth estimates from the RADAR reference depth image to track the device position.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
    one or more processors configured to:
        translate a radio detection and ranging (RADAR) reference depth map into depth information in at least one image plane of at least one camera, to form a three-dimensional (3D) RADAR depth image, wherein the 3D RADAR depth image includes a depth estimate of each pixel;
        initialize three-dimensional positions of visual features in a RADAR-aided visual inertial odometer, based on the depth estimates from the 3D RADAR depth image
        detect one or more two-dimensional positions of the visual features in a current camera image frame;
        associate the one or more two-dimensional positions of the visual features of the current camera image frame with predicted three-dimensional positions of the visual features of the current camera image frame;
        select two-dimensional positions of the visual features based on RADAR-based feature association;
        detect one or more two-dimensional positions of the visual features, including newly added visual features, in a second camera image frame;
        select two-dimensional positions of the visual features, including the newly added visual features, based on RADAR-based feature association;
        associate the one or more selected two-dimensional positions of the visual features, including the newly added visual features, of the second camera image frame with predicted three-dimensional positions of the visual features of the second camera image frame, based on the RADAR-based feature association; and
        estimate a three-dimensional position of the device in a world reference frame, based on the RADAR-based feature association, and based on the three-dimensional positions of the visual features, across two or more camera image frames, in the world reference frame.

2. The device of claim 1, further comprising at least one RADAR sensor, coupled to the one or more processors, configured to provide the RADAR reference depth map.

3. The device of claim 1, further comprising at least one camera configured to provide at least one image frame, wherein the camera image frame is located in the at least one image plane of at least one camera.

4. The device of claim 1, wherein the one or more processors are configured to initialize the RADAR-aided visual inertial odometer based on selected two-dimensional positions of the newly added visual features.

5. The device of claim 4, wherein the one or more processors are configured to initialize a RADAR-based feature state in the RADAR-aided visual inertial odometer.

6. The device of claim 4, wherein the one or more processors are configured to predict three-dimensional positions of the device based on the initialization of the three-dimensional positions of the newly added visual features based on the RADAR reference depth map.

7. The device of claim 1, where the one or more processors are configured to initialize a RADAR-based feature initializer in the RADAR-aided visual inertial odometer.

8. The device of claim 7, where the one or more processors are configured to initialize a state updater in the RADAR-aided visual inertial odometer.

9. The device of claim 4, further comprising a device controller including a steer controller configured to steer the device based on (i) the initialization of the three-dimensional positions of newly added visual features, (ii) the selected two-dimensional positions of the newly added visual features, and (iii) the RADAR-based feature association.

10. The device of claim 4, further comprising a device controller including a break controller configured to slow down the device based on (i) the initialization of three-dimensional positions of the newly added visual features, (ii) the selected two-dimensional positions of the newly added visual features, and (iii) the RADAR-based feature association.

11. The device of claim 4, further comprising a use alerter including a visual converter configured to convert the device position into a visual representation of the device position.

12. The device of claim 11, further comprising a display device configured to display the visual representation of the device position.

13. The device of claim 4, further comprising a use alerter including an audible converter configured to convert the device position into an audible representation of the device position.

14. The device of claim 13, further comprising one or more loudspeakers configured to play-out the audible representation of the device position.

15. The device of claim 4, further comprising one or more antennas and a transceiver, coupled to the one or more antennas, configured to transmit the device position, and a orientation and velocity of the device,
based on (i) the initialization of three-dimensional positions of newly added visual features, (ii) the selected two-dimensional positions of the newly added visual features, and (iii) the RADAR-based feature association.

16. The device of claim 15, wherein the one or more antennas and a transceiver are configured to receive, from a second device, at least one of: a position, orientation, or velocity, of the second device, for the device's path planning,
based on (i) the initialization of three-dimensional positions of newly added visual features, (ii) the selected two-dimensional positions of the new visual features, and (iii) the RADAR-based feature association.

17. The device of claim 4, further comprising a path planner configured to plan a navigation route, based on (i) the initialization of three-dimensional positions of newly added visual features, (ii) the selected two-dimensional positions of the new visual features, and (iii) a RADAR-based feature associator.

18. The device of claim 1, wherein the device is a vehicle or a drone.

19. The device of claim 1, wherein the translate a radio detection and ranging (RADAR) reference depth map into depth information in at least one image plane of at least one camera, to form a three-dimensional RADAR depth image, is an aligned 3D RADAR depth image, and the processor is configured to compute a depth of the 2D visual feature, which is directly compared with predicted three-dimensional positions of visual features.

20. A method comprising:
translating a radio detection and ranging (RADAR) reference depth map into depth information in at least one image plane of at least one camera, to form a three-dimensional RADAR depth image, wherein the 3D RADAR depth image includes a depth estimate of each pixel;
initializing three-dimensional positions of visual features in a RADAR-aided visual inertial odometer based on the depth estimates from the 3D RADAR depth image
detecting one or more two-dimensional positions of the visual features in a current camera image frame;
associating the one or more two-dimensional positions of the visual features of the current camera image frame with predicted three-dimensional positions of the visual features of the current camera image frame;
selecting two-dimensional positions of the visual features based on RADAR-based feature association;
detecting one or more two-dimensional positions of the visual features, including newly added visual features, in a second camera image frame;
selecting two-dimensional positions of the visual features, including the newly added visual features, based on RADAR-based feature association;
associating the one or more selected two-dimensional positions of the visual features, including the newly added visual features, of the second camera image frame with predicted three-dimensional positions of the visual features of the second camera image frame, based on the RADAR-based feature association; and
estimating a three-dimensional position of the device in a world reference frame, based on the RADAR-based feature association, and based on the three-dimensional positions of the visual features, across two or more camera image frames, in the world reference frame.

21. The method of claim 20, further comprising the initializing the three-dimensional positions of newly added visual features in the RADAR-aided visual inertial odometer based on the selected two-dimensional positions of the newly added visual features.

22. The method of claim 20, further comprising initializing a RADAR-based feature state in the RADAR-aided visual inertial odometer.

23. The method of claim 21, further comprising predicting the three-dimensional positions of the device based on the initializing of the three-dimensional positions of the newly added visual features based on a RADAR reference depth map.

24. The method of claim 21, further comprising initializing a RADAR-based feature initializer in the RADAR-aided visual inertial odometer.

25. The method of claim 21, further comprising steering the device based on (i) the initializing of the three-dimensional positions of newly added visual features, (ii) the selected two-dimensional positions of the newly added visual features, and (iii) a RADAR-based feature associator.

26. The method of claim 21, further comprising slowing down the device based on (i) the initializing of the three-dimensional positions of newly added visual features, (ii) the selected two-dimensional positions of the newly added visual features, and (iii) a RADAR-based feature associator.

27. An apparatus comprising:
means for translating a radio detection and ranging (RADAR) reference depth map into depth information in at least one image plane of at least one camera, to form a three-dimensional (3D) RADAR depth image, wherein the 3D RADAR depth image includes a depth estimate of each pixel;
means for initializing three-dimensional positions of newly added visual features in a visual inertial odometer based on the depth estimates from the 3D RADAR depth image to means for detecting one or more two-dimensional positions of the visual features in a current camera image frame;
means for associating the one or more two-dimensional positions of the visual features of the current camera image frame with predicted three-dimensional positions of the visual features of the current camera image frame;
means for selecting two-dimensional positions of the visual features based on RADAR-based feature association;
means for detecting one or more two-dimensional positions of the visual features, including newly added visual features, in a second camera image frame;
means for selecting two-dimensional positions of the visual features, including the newly added visual features, based on RADAR-based feature association;
means for associating the one or more selected two-dimensional positions of the visual features, including the newly added visual features, of the second camera image frame with predicted three-dimensional positions of the visual features of the second camera image frame, based on the RADAR-based feature association; and
means for estimating a three-dimensional position of the device in a world reference frame, based on the RADAR-based feature association, and based on the three-dimensional positions of the visual features, across two or more camera image frames, in the world reference frame.

28. A non-transitory computer-readable storage medium having stored thereon instructions that, when executed, cause one or more processors of a device to:
translate a radio detection and ranging (RADAR) reference depth map into depth information in at least one image plane of at least one camera, to form a three-dimensional (3D) RADAR depth image, wherein the 3D RADAR depth image includes a depth estimate of each pixel;
initialize three-dimensional positions of newly added visual features in a RADAR-aided visual inertial odometer based on the depth estimates from the 3D RADAR depth image
detect one or more two-dimensional positions of the visual features in a current camera image frame;
associate the one or more two-dimensional positions of the visual features of the current camera image frame with predicted three-dimensional positions of the visual features of the current camera image frame;
select two-dimensional positions of the visual features based on RADAR-based feature association;
detect one or more two-dimensional positions of the visual features, including newly added visual features, in a second camera image frame;
select two-dimensional positions of the visual features, including the newly added visual features, based on RADAR-based feature association;
associate the one or more selected two-dimensional positions of the visual features, including the newly added visual features, of the second camera image frame with predicted three-dimensional positions of the visual features of the second camera image frame, based on the RADAR-based feature association; and
estimate a three-dimensional position of the device in a world reference frame, based on the RADAR-based feature association, and based on the three-dimensional positions of the visual features, across two or more camera image frames, in the world reference frame.

* * * * *